United States Patent [19]

Anderson

[11] Patent Number: 5,069,575

[45] Date of Patent: Dec. 3, 1991

[54] ROLL FORMING NOTCHES IN A THIN-WALL POWER TRANSMISSION MEMBER

[75] Inventor: Carl Anderson, Mt. Clemens, Mich.

[73] Assignee: Anderson Cook, Inc., Fraser, Mich.

[21] Appl. No.: 528,256

[22] Filed: May 24, 1990

Related U.S. Application Data

[62] Division of Ser. No. 406,455, Sep. 13, 1989, Pat. No. 4,956,986, which is a division of Ser. No. 302,374, Jan. 27, 1989, Pat. No. 4,891,962, which is a division of Ser. No. 263,396, Oct. 27, 1988, Pat. No. 4,882,926, which is a division of Ser. No. 88,696, Aug. 21, 1987, Pat. No. 4,819,468.

[51] Int. Cl.⁵ .............................................. B25G 3/28
[52] U.S. Cl. .................................... 403/359; 403/298; 192/70.2
[58] Field of Search ....................... 403/359, 326, 298; 192/70.2

[56] References Cited

U.S. PATENT DOCUMENTS 4,014,619 3/1977 Good et al. ................. 403/359

FOREIGN PATENT DOCUMENTS 2123905 2/1984 United Kingdom ............... 192/70.2

Primary Examiner—Andrew V. Kundrat
Attorney, Agent, or Firm—Brooks & Kushman

[57] ABSTRACT

An apparatus and method for forming a power transmission member from a thin-walled blank, the apparatus including a pair of dies (84) having opposed work surfaces, and a mandrel (50) positioned between the work surfaces of the dies (84) for receiving a blank (52) to be formed and rotated upon movement of the work surfaces of the dies in opposite directions during a forming operation. The mandrel (50) includes a work surface for cooperating with the work surface of the dies (84). Notch forming projections (70) on the work surfaces of the dies (84) cooperate with the work surfaces of the mandrel (50) for roll punching notches (72) through the blank (52) as the blank (52) is rotated between the moving dies (84).

4 Claims, 3 Drawing Sheets

ROLL FORMING NOTCHES IN A THIN-WALL POWER TRANSMISSION MEMBER

This is a divisional of copending application Ser. No. 406,455 filed Sept. 13, 1989, now U.S. Pat. No. 4,956,986 as a divisional of application Ser. No. 302,374, now U.S. Pat. No. 4,891,962, filed on Jan. 27, 1989 as a divisional of application Ser. No. 263,396, now U.S. Pat. No. 4,882,926, filed on Oct. 27, 1988 as a divisional of application Ser. No. 088,696 which was filed on Aug. 21, 1987 and issued as U.S. Pat. No. 4,819,468.

TECHNICAL FIELD

This application relates to thin-walled power transmission members and to a method and apparatus for making the power transmission member from a thin-walled blank.

BACKGROUND ART

The U.S. Pat. No. 3,982,415, issued Sept. 28, 1976, and assigned to the same assignee as the subject invention, discloses a power transmission member made from a thin-wall blank sleeve by a rolling operation. Such a power transmission member is utilized in a vehicle automatic transmission clutch as a clutch hub. The clutch hub has a thin-walled annular sleeve portion wherein the clutch hub splines are formed.

The aforementioned U.S. Pat. No. 3,982,415 discloses a method and machine for splining a power transmission member by rolling, as well as the resultant splined member. An externally toothed pinion type mandrel of the machine is rotatably mounted between elongated die racks. An unsplined member is supported by the mandrel so that sliding movement of the elongated dies from an initial end-to-end relationship to an overlapping relationship meshes teeth on the dies and teeth on the mandrel with a thin-walled annular sleeve portion of the member therebetween. The meshing of the die and mandrel teeth deforms the sleeve portion of the member radially in a rolling manner, forming splines as the mandrel rotates.

The U.S. Pat. No. 4,677,836, issued Jul. 7, 1987 and assigned to the assignee of the present invention discloses an apparatus for simultaneously flanging and splining the thin-walled blank to make a splined and flanged power transmission member. A toothed mandrel is rotatably supported between a pair of toothed dies. The dies and mandrel have chamfered surfaces for forming a flange on the thin-walled member as the tooth surfaces of the dies and mandrel are relatively moved during a spline operation.

In use in a transmission assembly, sleeves of the type described above are axially moved in relationship to a splined gear member to be received thereover for meshing engagement between the splines on the sleeve and the teeth on the gear. It is known in the art to form notches in at least some of the splines, the notches functioning as stops which limit the axial movement of the splines in meshing relationship with the teeth of the gear. The notches are generally preformed in a separate punching operation after the splines are formed in the thin-walled blank sleeve. A thin-walled blank sleeve is moved to a second operation site where a single punch moves radially relative to the central axis of the sleeve to form notches in individual splines. Each notch is formed by the puncturing portion of the punch stretching and cutting the metal pressed by the radially moving punch.

The present invention provides a more efficient and less expensive means of forming notches in the splines of a power transmission sleeve member. This is accomplished by the present invention not requiring a two step spline forming and punching process but rather a single step simultaneous forming of splines and notches.

SUMMARY OF THE INVENTION

The present invention provides an apparatus for forming a power transmission member from a thin-walled blank, the apparatus including die means having opposed work surfaces and a toothed mandrel positioned between the opposed work surfaces of the die means for receiving a blank to be formed and rotated upon movement of the work surfaces in opposite directions during a forming operation. The mandrel includes a work surface for cooperating with the work surfaces of the die means. Notch forming means on the work surfaces of the die means is cooperable with the work surface of the mandrel for roll punching notches through the blank as the blank is rotated between the moving die members.

BRIEF DESCRIPTION OF DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
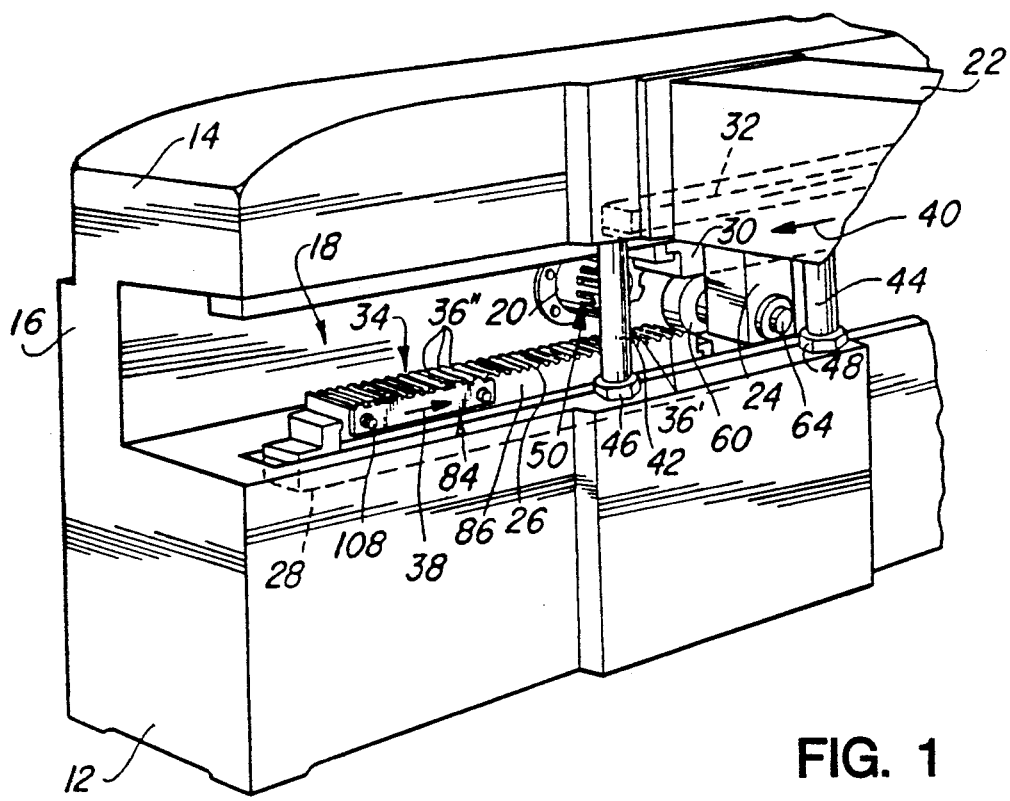
FIG. 1 is a perspective view of an apparatus constructed in accordance with the present invention.

An apparatus for forming a power transmission member from a thin-walled blank is generally shown at 10 in the Figures. The apparatus 10 includes a lower support base 12, an upper base 14, and an intermediate support portion 16. The intermediate support portion 16 extends upwardly from the lower base 12 and the upper base 14 extends forwardly from the intermediate support portion 16 to cooperate with the lower support base 12 in defining a downwardly confined work space, generally indicated at 18. A fixed head stock 20 is mounted on the intermediate support portion 16 between the lower and upper bases 12 and 14. A tail stock support arm 22 projects from the upper base 14 and includes a suitable slide arrangement for supporting a tail stock 24. The tail stock 24 depends downwardly from the support arm 22 and is slideably moveable toward an away from the head stock 20 along a rectilinear path.

Within the work space 18 of the machine, a lower die, comprising an elongated rack 26 is slideably supported on the lower base 12 by a slide support shown in phantom at 28. An elongated upper die 30 is supported on the upper base 14 by a slide support, also shown in phantom at 32. The slide supports 28,32 mount the dies 26,30 in a parallel spaced relationship with respect to each other for sliding movement between the end-to-end relationship shown in FIG. 1 and an overlapping relationship. Each of the dies 26,30 is elongated rectilinearly and has a work surface generally indicated at 34. Each work surface includes teeth 36 spaced along its length. The die teeth 36 extend transversely with respect to the direction of the die movement and are oriented in spaced and parallel fashion opposing the die teeth of the other of the die members when the dies assume their overlapping relationship after movement in the direction of the arrows 38,40.

The dies 26,30 are actuated by a suitable power operated actuator that coordinates the movement of each of the dies 26,30 with that of the other to perform a splining operation which will be described below. A pair of rods 42,44 extend between the lower and upper bases 12,14 and are threaded into respective nuts 46,48 on the lower and upper bases 12,14 (the nuts on the upper base 14 not being shown) to control the deflection permitted between the dies during the splining operation. Rotation of the rods 42,44 increases or decreases the tension along the rod lengths depending on the direction of rotation to either allow greater or lesser die deflection as required.

Although the subject invention is shown with elongated dies 26,30, rotary dies may also be used to practice the present invention.

Figure 2:
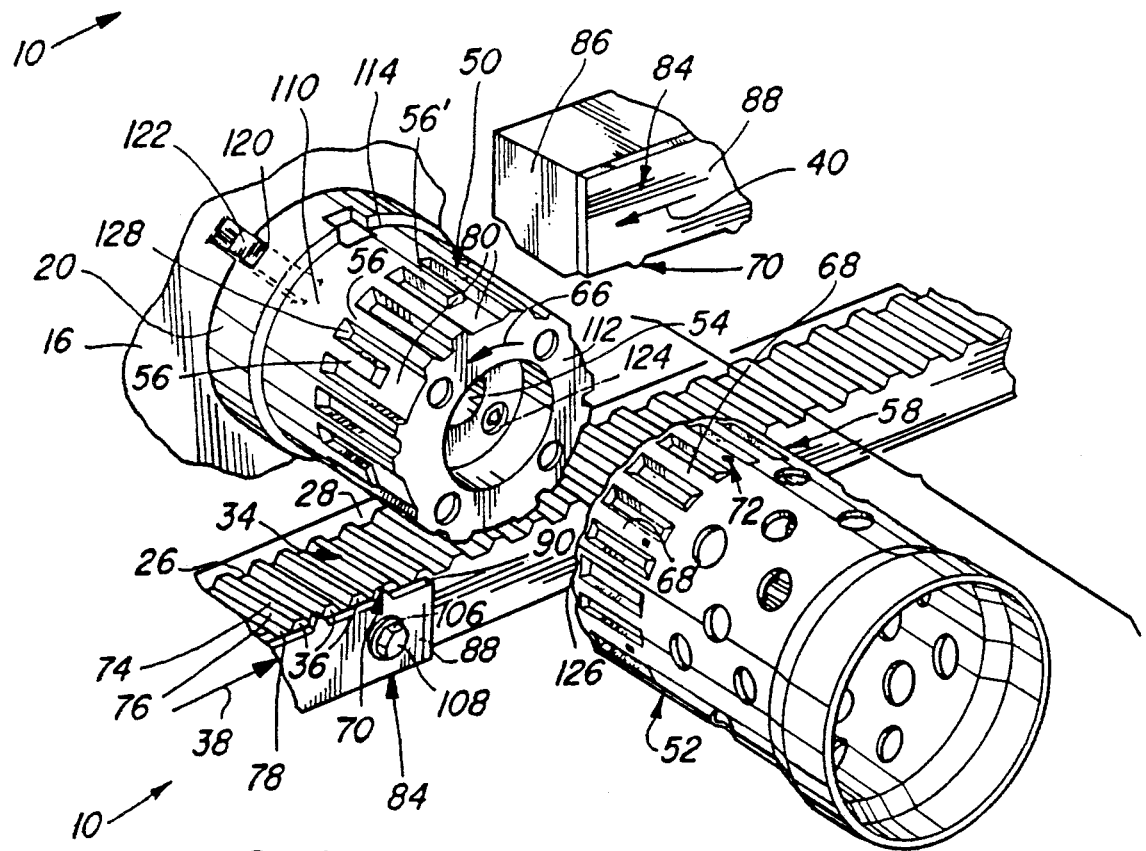
FIG. 2 is an enlarged exploded view of the mandrel, forming dies, and a sleeve member, all constructed in accordance with the present invention.
Figure 3:
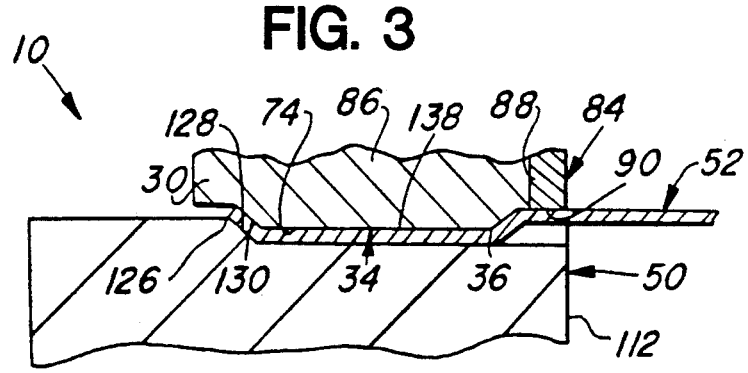
FIG. 3 is a cross sectional fragmentary view of a formed spline between a die and mandrel.
Figure 4:
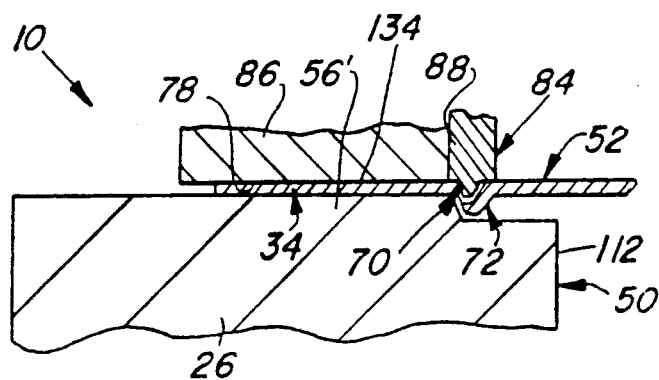
FIG. 4 is a cross sectional view of a notched spline portion of a sleeve member between a forming die and the mandrel.

As shown in FIGS. 2-4, an externally toothed pinion type mandrel is generally indicated at 50. The mandrel 50 is positioned between the opposed work surfaces 34 of the dies 26,30 for receiving a blank to be formed and rotated upon movement of the work surfaces 34 in opposite directions during the forming operation. The blank can be a power transmission member generally indicated at 52 of the type that can be utilized as a vehicle automatic transmission clutch hub blank. Other power transmission members used to transmit rotary power can likewise be formed by the subject apparatus 10, however, the present invention will be described in relation to this particular type of power transmission member.

As shown in FIG. 2, the mandrel 50 has a central axis 54 about which a work surface having a plurality of teeth 56 are generated. The mandrel teeth 56 project radially in an outward direction from the central mandrel axis 54. The teeth 56 are spaced about the central axis 54 so as to engage an axially peripheral sleeve portion generally indicated at 58 of the sleeve member 52. The teeth 56 are elongated in a direction parallel to the central mandrel axis 54.

An arbor 60 is mounted in a suitable manner on the tail stock 24 and includes a shaft 64 projecting toward the head stock 20. The tail stock 24 is moveable toward and away from the mandrel 50, allowing the mandrel 50 to accept a clutch hub blank supported on an end thereof. The tail stock 24 is then moved towards the head stock 20 so that the ends of the mandrel 50 receive the shaft 64. The fixed head stock 2 and moveable tail stock 24 then mount and support the mandrel 50 in a rotatable fashion around the axis 54 which is located midway between the upper and lower dies 26,30. For this purpose, an automatic feed rack can hold a number of blanks which may be successively fed onto the mandrel 50 and tail stock 24.

When the mandrel 50 is supported as described above, the lower and upper dies 26,30 are respectively positioned generally adjacent the upper and lower sides of the mandrel 50. After the loading of the blank onto the mandrel 50, the apparatus 10 is actuated to drive the dies 26,30 into their overlapping relationship so that the die teeth 34 engage the outer surfaces of the annular sleeve portion 58 of the clutch hub blank. As the dies 26,30 move into their overlapping relationship, the portion of the respective die teeth 36 and opposite lateral sides of the dies 26,30 and the adjacent portions of the mandrel teeth 56 are meshed with the sleeve portion 58 of the hub length located therebetween. The meshing of the die teeth 36 and the mandrel teeth 56 deforms the sleeve portion 58 radially with respect to the central axis 54 of the mandrel 50 and concomitantly therewith rotates the mandrel 50 about the axis 54 in the direction shown by the arcuate arrow 66 in FIG. 2. The lower and upper dies 26,30 simultaneously or synchronously deform the hub blank to form splines at diametrically opposed positions on the mandrel 50.

After the dies 26,30 have been moved into their overlapping relationship to complete the splining operation, the sleeve portion 58 of the hub 52 defines radially and outwardly facing splines 68. The dies 26,30 are returned to their initial end-to-end relationship whereupon the splined member 52 is removed and another blank loaded.

The present invention includes notch forming means generally indicated at 70 on the work surfaces 34 of the dies 26,30 cooperable with the work surface of the mandrel 50 for roll punching notches, generally indicated at 72, through the sleeve member blank 52 as the blank 52 is rotated between the moving dies 26,30 and mounted on the mandrel 50.

More specifically, the spline forming teeth 36 on the work surfaces 34 of the dies 26,30 include top walls 74, side walls 76, and land surfaces 78. The land surfaces 78 and the side walls 76 define troughs between the teeth 36. The notch forming means 70 includes a plurality of notching forming projections 70 extending from at least some of the land surfaces 78 into the troughs.

The work surface of the mandrel 50 includes the plurality of spline forming teeth 56 which cooperate in mating engagement with the troughs between the spline forming teeth 36 of the dies 26,30 to form the splines 68 in the sleeve member 52. At least some of the spline forming teeth 56' of the mandrel 50 include recessed portions 80 corresponding to the mating engagement of the spline forming teeth 56' of the mandrel 50 with those of the troughs including the notch forming projections 70 whereby the notch performing projections 70 extend into the recesses 80 during the spline and notch forming operation.

As shown in FIG. 1, some of the spline forming teeth 36' of the dies 26,30 are teeth for initially rough forming splines on the blank 52. Other spline forming teeth 36" are finish forming teeth for finishing the initially formed rough splines into finished splines. The notch forming projections 72 are disposed between at least some of the finish forming teeth 36". In other words, the rough formed teeth ar initially formed and the notches are roll punched in the initially formed rough teeth during the finish forming operation.

As shown in the preferred embodiment, the notch forming means includes a plurality of notch forming die members generally indicated at 84 mounted on the apparatus 10 adjacent the spline forming die members 26,30. Each of the spline forming die members 26,30 includes a body portion 86 supporting the work surface 34 thereof. Each of the notch forming die members 84 includes a body portion 88 having an upper surface 90 which is substantially level with the land surfaces 78 of the spline forming dies 26,30. The projections 70 extend from the upper surface 90.

Figure 5:
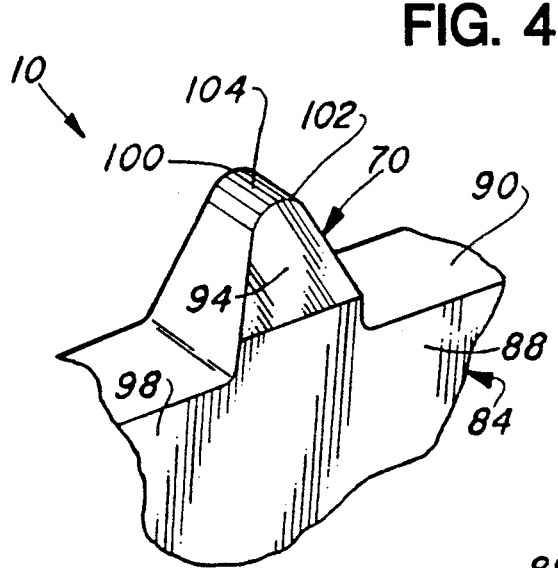
FIG. 5 is an enlarged perspective fragmentary view of one face of the punching die constructed in accordance with the present invention.
Figure 6:
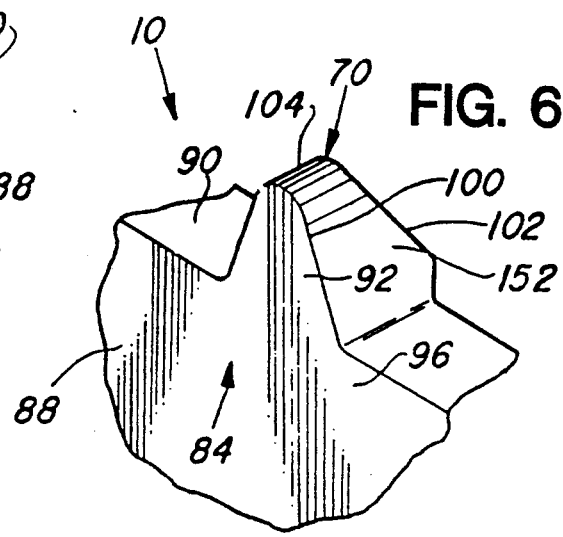
FIG. 6 is an enlarged fragmentary perspective view of the opposite face of a punching die constructed in accordance with the present invention.

The notch forming die member 84 includes alignment means for aligning the elongated body portion 88 with the body portion 86 of the spline forming die members 26,30 and further aligning the notch forming projections 70 with the troughs between the teeth 36 of the spline forming die members 26,30. More specifically, each of the projections 70 are spaced an equal distance apart along the upper surface 90 of the body portion 88. Each projection 70 includes a triangular projection integral with and extending from the upper surface 90. Each projection 70 includes a rear face 92 and a front face 94, as shown in detail in FIGS. 5 and 6. The rear face 92 is continuous with the rear face 96 of the body portion 88. Likewise, the front face 94 of the projection 70 is continuous with the front face 98 of the body portion 88. The rear face 96 of the body portion 88 extends to an edge 100 defining the triangular shape of the projection 70 the front face 94 tapers from the front face 98 of the body portion 88 to a front edge 102. The triangular shape of the projections 70 defines a distal point 104 of the projection 70, the distal point 104 being substantially rounded. This specific configuration of the projection 70 adapts the projection 70 for the roll notch forming operation. Unlike prior art notch forming operations wherein a die member is moved radially inwardly to punch a notch in a workpiece, the present invention is specifically suited for roll notch forming wherein the workpiece to be notched in rolling about the axis 54 as the notch forming projections 70 roll punch notches in the workpiece 52.

The alignment means includes a plurality of openings 106 extending through the body portion 88 of the die member 84 for being aligned with openings (not shown) extending through the body portion 86 of the die members 26,30 at a predetermined position to dispose the projections adjacent the troughs between the spline forming teeth 36 extending from the work surface 34 of each of the die members 26,30.

The slide supports 28,32 provide support means for supporting each of the notch forming die members 84 adjacent each of the spline forming dies 26,30. The apparatus 10 includes connecting means for simultaneously connecting the spline forming die members 26,30 and notch forming die members 84 to the support means 28,32. The connecting means includes a plurality of bolt members 108 which extend through the openings 106 in the notch forming die members 84 and openings (not shown) in the body portions 86 of the die members 26,30, the bolts 108 engaging the support means 28,32. The bolt members 108 sandwich the spline forming die members 26,30 between the support means 28,32 and the notch forming die members 84.

The head stock 20 provides mounting means for mounting the mandrel 50 on the apparatus 10 for rotation about the central axis 54 between the work surfaces 34 of the die members 26,30. The mandrel 50 includes a body portion 110 for receiving and supporting the sleeve portion 58 of the blank member thereover. The work surface generated around the central axis 54 of the mandrel 50 cooperates with the work surfaces 34 of the pair of die members 26,30 to form the transmission member 52 from the blank during the forming operation. As previously discussed, the work surfaces include a plurality of recesses 80 therein for cooperating with the spaced notch forming projections 70 extending from the die members 84 to form the notches 72 in the blank during the forming operation. The work surface of the mandrel 50 has a loading axial end 112 for receiving the blank thereover and an opposite axial end 114 adjacent the head stock 20. The recesses 80 extend from the loading axial end 112 of the work surface of the mandrel 50 axially into the work surface. A portion of the teeth 56 is removed extending from the loading axial end 112 towards the rear end 114. It is necessary that each of the teeth 56' which include the recesses 80 include at least a root portion of the tooth 56' as the portion of the splined tooth 68' including the notch 72 must be fully formed below the notch 72. Since the notch 72 represents a stop for mating with a gear member 116, as shown in FIG. 7, the portion of the splined tooth 68' above the notch 72 need not be finished as it never mates with a gear tooth.

The apparatus 10 includes synchronizing means for synchronizing the movement of the mandrel 50 and die members 26,30. More specifically, the head stock 20 includes a keyed attachment for aligning and synchronizing the spline forming teeth 56' which include the recesses 80 with the projections 70 on the notch forming die members 84. A slotted portion shown in phantom at 120 in FIG. 2 is formed diametrically across the rear end. The slotted portion 120 receives a complimentary projection 122 from the head stock 20. Similarly, there are notches 124 in the mandrel 50 which engage complimentary projections (not shown) on the end of the shaft 64 as the tail stock 24 is moved toward the head stock 20, rotatably supporting the mandrel 50 at either end thereof.

The assembly 10 includes cooperating chamfering means on the die members 26,30 and mandrel 50 operable during the forming operation for simultaneously forming a radially outwardly projection chamfered flange 126 on the sleeve member 52 between the splines 68 formed thereon. The chamfering means includes an angled forming surface 128 on the mandrel which cooperates with the angle forming surface 130 on the teeth 36 of the dies 26,30 to form the flange 126 between splines 68 on the sleeve member 52.

Figure 7:
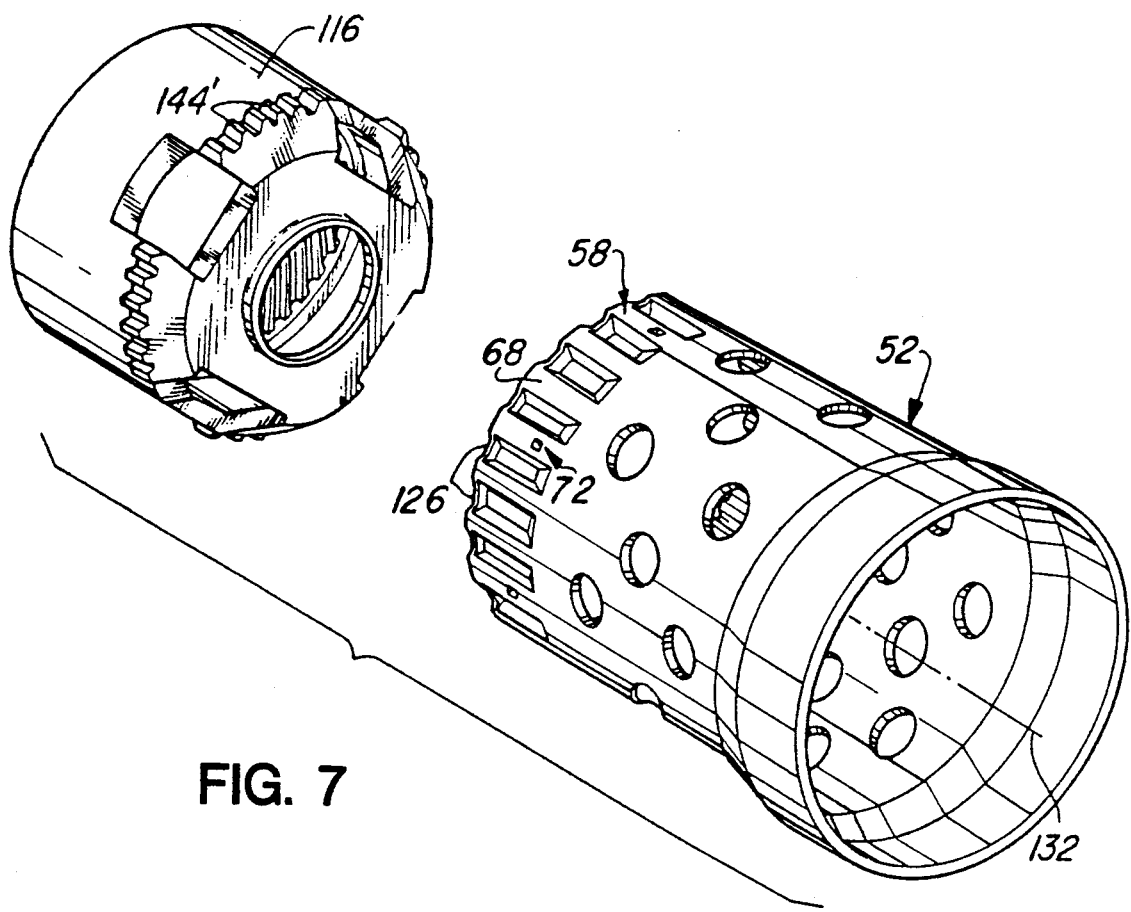
FIG. 7 is an exploded perspective view of a transmission sleeve member constructed in accordance with the present invention and a transmission gear member.
Figure 8:
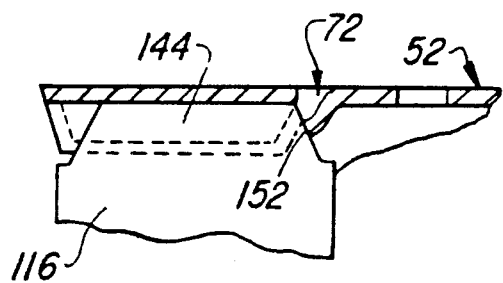
FIG. 8 is an enlarged fragmentary cross sectional view of the thin-wall power transmission member constructed in accordance with the present invention disposed over the gear member.
Figure 9:
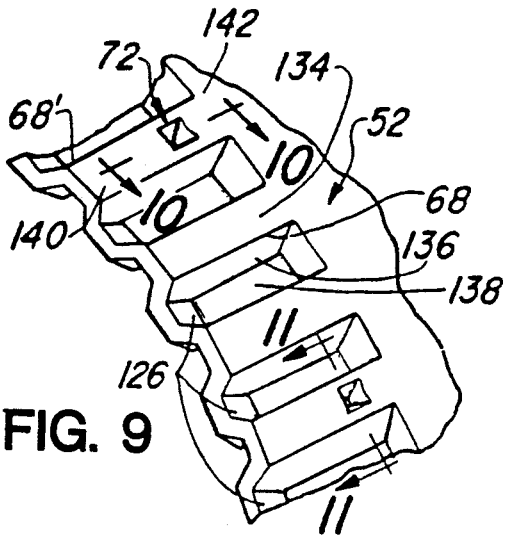
FIG. 9 is a perspective fragmentary view of the splined portion of a sleeve member constructed in accordance with the present invention.
Figure 10:
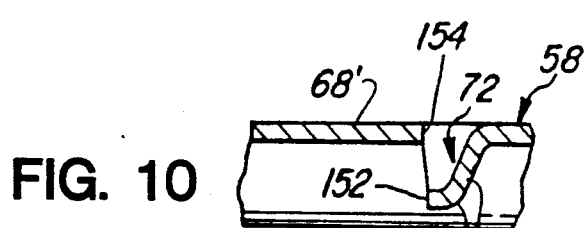
FIG. 10 is an enlarged fragmentary cross sectional view taken substantially along lines 10—10 of FIG. 9.
Figure 11:
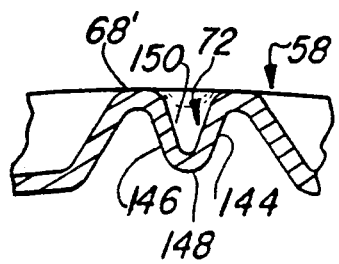
FIG. 11 is a cross sectional fragmentary view taken substantially along lines 11—11 of FIG. 9.

The power transmission member 52 made by the subject apparatus 10 includes a central axis 132 shown in FIG. 7 and the annular sleeve portion 58. The sleeve portion 58 includes a plurality of aligned roll formed notches 72 punched therethrough by the rolling process described above which incorporates the mandrel 50 received within the sleeve portion 58 and the pair of notch forming dies 84 having the notch forming projections 70 along the length of the dies 84. The sleeve portion 58 includes the plurality of splines 68, each of the splines 68 having a top wall 134, side walls 136 and bottom walls 138. At least some of the top walls 134 include the notches 72 roll punched therethrough. The notched splines 68' each include the finished spline portion 140 between the edge of the sleeve to a position adjacent the notch 72, and a substantially unfinished portion 142 on the opposite side of the notch 72. As discussed above, since the teeth 144' of the gear 116 need only mesh with the portion 140 of the spline 68 below the notch 72, it is not necessary for the remainder 142 of the spline 68' to be substantially finished. Hence, there is no loss function due to the forming of the splines 68' over the partial teeth 56'.

Each of the notches 72 include a pair of side walls 144,146 extending radially inwardly from the sleeve portion 58 and converging to a substantially rounded portion 148. Each notch 72 includes a substantially triangular top wall 150 extending between the side walls 144,146 and radially inwardly from the sleeve portion 58. The rounded portion 148 at one axial end of the notch has an edge 152 cut from the adjacent edge 154 of the sleeve portion 58. The other axial end of each notch 72 is connected to the sleeve portion 58 at the top wall 134 of the a associated spline 68. One of the side walls 144 of the notch 72 is rolled into the notch 72 and the other of the side walls 146 is stretched into the notch 72 by the rolling operation. At the same time, the edge 152 is cut from the edge 154, thus forming the roll formed notch 152. As shown in FIG. 7, the edge 152 of the notch 72 provides a stop for abutting against the tooth 144 of the gear 116.

The present invention further provides a method for forming the notches 72 in the thin-walled annular sleeve portion 58 of the transmission member 52. The method generally includes the steps of rotating the blank annular sleeve member mounted on the mandrel 50 between the two dies 26,30 and roll punching the projections 70 extending from the dies 84 through the sleeve member as the sleeve member is rotated thereby.

More specifically, the present invention provides a means for simultaneously forming splines 68 in the sleeve member 52 while punching the notches 72 in at least some of the splines 68' as the sleeve member 52 and mandrel 50 as rotated between the two dies 84. The spline forming is accomplished by first rough forming the splines and secondly finish forming the initially rough formed splines while simultaneously roll punching the notches 68' in at least some of the rough formed splines as they are being finish formed.

With specific regard to the roll punching method, an initial depression is formed in a spline 68' with a side wall 152 of the triangular shaped projection 70 over a recess 80 in a mandrel tooth 56'. The side wall 152 forces the depressed metal of the spline 68' sideways into the spline 68' while stretching the opposite side 146 of the depressed area to form the notch 72. Simultaneously, the edge 100 of the projection 70 cuts the portion 152 of the depressed area of the spline 68' to be notched closest to the edge of the spline 68' with the edge 100 of the projection 70 while stretching the axially opposite side 150 of the depression with the tapering side 94 of the projection 70. Thusly, the novel punching dies 84 of the present invention form roll formed projections 72 having structural characteristics not found in previously formed radially punched notches.

The present invention provides a one step means for roll forming notches in a sleeve member. The present invention does not require the two step process of the prior art and therefore provides a more efficient and economic means for forming notches in a thin-walled sleeve member.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A power transmission member (52) comprising: an annular sleeve portion (58) having a central axis (132), said sleeve portion including a plurality of aligned roll formed notches (72) punched therethrough by a rolling process incorporating a mandrel (50) received within said sleeve portion (58) and a pair of notch forming dies (84) having notch forming projections (70) along the length of said dies (84), and each roll formed notch having one axial end including an inwardly projecting cut edge and having another axial end that is connected to the sleeve portion.

2. A power transmission member (52) comprising: an annular sleeve (58) having a central axis (132) and including a plurality of splines (68) and notches (70) roll formed in the sleeve portion (58) by a rolling process including a toothed mandrel (50) received within the sleeve portion (58) and a pair of toothed dies (84), said splines (68) having top walls (134), side walls (136) and bottom walls (138), at least some of said top walls (134) including said notches (70) roll punched therethrough and extending inwardly from the top walls of the splines, said notched splines (68') each including a finished spline portion (140) on the distal side of said notch (72) and a substantially unfinished portion (142) on the opposite side of said notch (72).

3. A power transmission member (52) comprising: an annular sleeve (58) having a central axis (132) and including a plurality of aligned roll formed notches (72) punched therethrough by a rolling process incorporating a mandrel (50) received within said sleeve portion (58) and a pair of notch forming dies (84) having notch forming projection (70) along the length of said dies (84), each of said notches (72) including a pair of side walls (144,146) extending radially inwardly from said sleeve portion (58) and converging to a substantially rounded portion (148) and a substantially triangular top wall (150) extending between said side walls (144,146) and radially inwardly from said sleeve portion (58), said rounded portion (148) having an edge (152) cut from the adjacent edge (154) of said sleeve portion (58).

4. A member (52) as set forth in claim 3 wherein one of said side walls (144) of said notch (72) is rolled into said notch (72) and the other of said side walls (146) is stretched into said notch (72).

* * * * *

UNITED STATES PATENT AND TRADEMARK OFFICE
CERTIFICATE OF CORRECTION

PATENT NO. : 5,069,575

DATED : December 3, 1991

INVENTOR(S) : Carl Anderson

It is certified that error appears in the above-identified patent and that said Letters Patent is hereby corrected as shown below:

Column 4, line 11, "2" should be --20--;

Column 5, line 11, "ar" should be --are--.

Signed and Sealed this

Twentieth Day of April, 1993

Attest:

MICHAEL K. KIRK

*Attesting Officer*     *Acting Commissioner of Patents and Trademarks*